D. E. WILSON.
Cattle-Fastener.

No. 219,052. Patented Aug. 26, 1879.

WITNESSES:
W. W. Hollingsworth
Amos W. Hart

INVENTOR:
David E. Wilson
BY
ATTORNEYS.

UNITED STATES PATENT OFFICE.

DAVID E. WILSON, OF DARLINGTON, MARYLAND.

IMPROVEMENT IN CATTLE-FASTENERS.

Specification forming part of Letters Patent No. 219,052, dated August 26, 1879; application filed July 13, 1879.

*To all whom it may concern:*

Be it known that I, DAVID E. WILSON, of Darlington, in the county of Harford and State of Maryland, have invented a new and Improved Cattle-Fastener; and I do hereby declare that the following is a full, clear, and exact description of the same.

Provision has been made for releasing several cattle in a stable simultaneously, by loosening the neck-chains or halters from the mangers or stanchions through the medium of the adjustment of one and the same device; but so far as I am aware means have not heretofore been employed or devised for hitching or securing the animals simultaneously, and thereby avoiding the necessity of tying or fastening each halter, rope, or neck-chain separately.

My invention is adapted to perform this function, and also to release the cattle simultaneously.

It consists, mainly, of a crank-rod or eccentrically-pivoted bar, which is arranged close to the inner side of a series of mangers, so that when turned up or revolved a part revolution it will clamp against the manger the ends of the chains or halters which are pendent from the necks or heads of the cattle, and thus secure the latter. When turned down, it will release all the neck-chains or halters at the same time.

The invention also relates to devices for locking the clamp rod or bar, so as to prevent accidental release of the ropes or chains.

Figure 1:
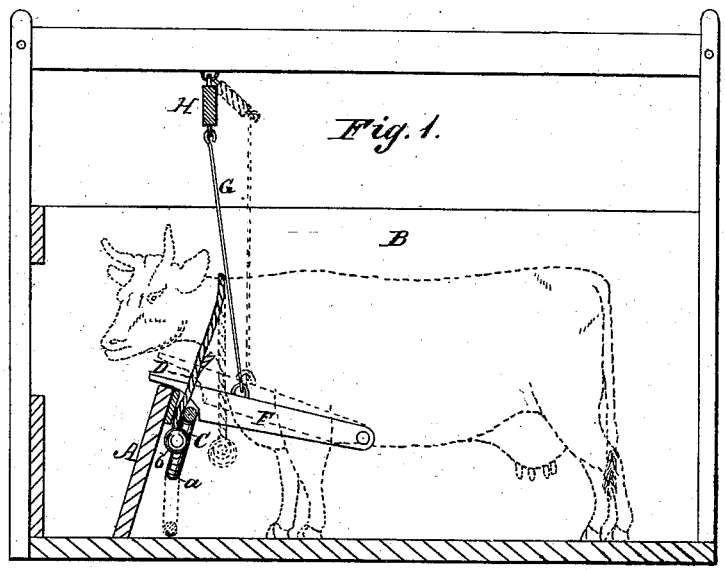
Figure 2:
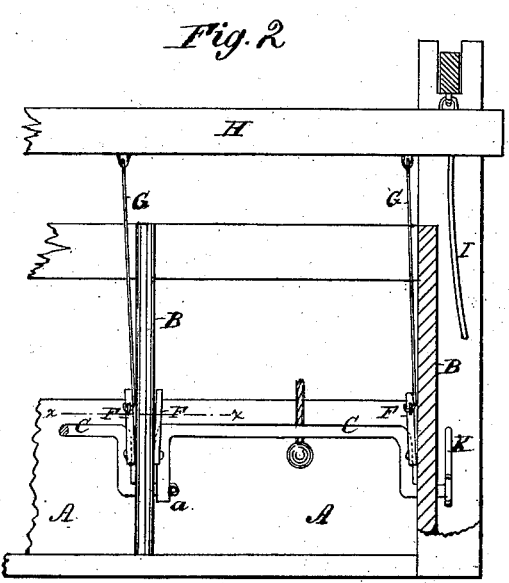
Figure 3:
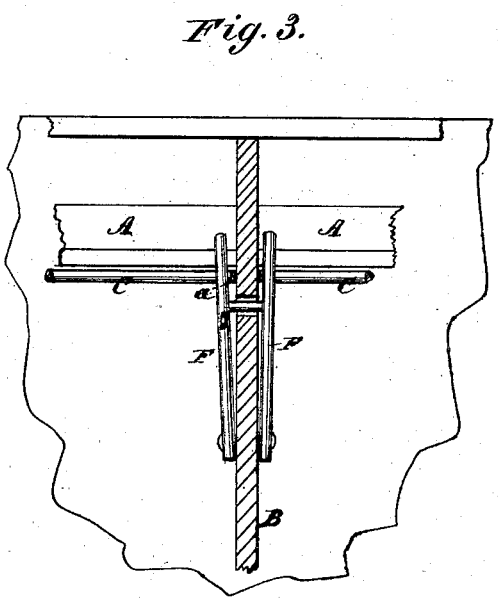

In the accompanying drawings, forming part of this specification, Figure 1 is a vertical cross-section of a stall having my improvement attached. Fig. 2 is an end view of a stall, part of one partition being broken away. Fig. 3 is a horizontal section on line *x x*, Fig. 2.

A indicates the inner side of a manger, and B B the parallel sides or partitions of a cattle-stall. C is the crank-rod or clamp-bar for securing the chains or ropes D, which are pendent from the necks of the cattle. Said rod extends through all the stalls, which are in line, and is placed parallel to the side A of the several mangers of the same.

That portion of the rod which is between the sides B of each stall is bent twice at each end at a right angle, as shown. Thus the rod has a number of short bends corresponding to the number of stall-partitions, and horizontal portions *a* of the several bends form the wrists of the cranks of the journals of the rod on which it is supported and rotated in the several partitions.

The short pendent portions of the chains attached to the necks of the cattle have a ball, *b*, attached to their lower ends. When the cattle enter their several stalls they will at once advance to the manger to obtain their accustomed feed, and thus the pendent neck-chains will come in contact with the front side, A, of the manger, and the ball *b* hang below its upper edge. The cattle being all in their proper places, the crank-rod C is then rotated, and the chain clamped by it (Fig. 1) against the manger at a point above the ball *b*, and is locked in such raised position by means of the pawls F, which prevents the withdrawal of the chains, and hence secures all the cattle.

The pawls or locking-levers F are pivoted to the partitions B, and provided with notches or shoulders, which adapt them to engage the crank-rod C when in the raised position.

To raise the pawls F, I connect them by rods G with a swinging bar, H, which is pivoted above the mangers and provided with a hand-lever. By the operation of the latter the bar H will be tilted, the pawls F elevated, and the crank-rod allowed to fall or rotate backward to its pendent position, all as shown in dotted lines, Fig. 1, thus releasing all the cattle simultaneously.

To rotate the crank-rod C, I may apply a lever, K, to one end thereof, or employ any other equivalent device.

For convenience in placing the crank-rod C in position, I prefer to construct it in sections, and to make the wrist portions separate. In such case the ends of the latter are tenoned in mortises or slots in the bent ends of the cranks proper, as shown in Fig. 2.

What I claim is—

1. A crank-rod, C, or rod having one or more bends, in combination with a stall-manger, the same being pivoted or journaled alongside the manger, as shown and described, so that it may be turned to bring the bends thereof against the manger for the purpose of clamping the neck-chains of cattle, as specified.

2. The crank-rod or eccentrically-pivoted bar C, in combination with the side A of the manger, the neck-chains and the balls $b$ attached thereto, as shown and described, whereby the rod is adapted to be rotated a part of a revolution to clamp the chains against the side of the manger and thus prevent their withdrawal, as specified.

3. In combination with the pivoted crank-rod, the notched or shouldered pawls F, the rods, swinging bar, and hand-lever, as shown and described.

The above specification of my invention signed by me this 27th day of May, 1879.

DAV. E. WILSON.

Witnesses:
AMOS W. HART,
SOLON C. KEMON.